United States Patent
Cook et al.

[15] 3,679,793
[45] July 25, 1972

[54] METHOD OF RAISING THE WHITE BLOOD CELL COUNT

[72] Inventors: Elton S. Cook, Cincinnati, Ohio; Leo G. Nutini, Burlington, Ky.

[73] Assignee: Stanley Drug Products, Inc., Portland, Oreg.

[22] Filed: Feb. 13, 1970

[21] Appl. No.: 11,299

Related U.S. Application Data

[63] Continuation-in-part of Ser. No. 739,639, June 25, 1968.

[52] U.S. Cl..............................424/95, 424/106, 424/115, 424/195
[51] Int. Cl...................................A61k 17/00, A61k 27/00
[58] Field of Search..........................424/95, 106, 195, 115

[56] References Cited

UNITED STATES PATENTS

| | | | |
|---|---|---|---|
| 2,320,479 | 6/1943 | Sperti | 424/95 |
| 2,239,345 | 4/1941 | Sperti | 424/106 |
| 2,320,478 | 6/1943 | Sperti | 424/195 |

*Primary Examiner*—Sam Rosen
*Attorney*—Melville, Strasser, Foster & Hoffman

[57] ABSTRACT

A method of raising the white blood cell count in mammals by administering thereto a deproteinized extract from yeast and certain animal tissues such as brain, spleen and others, in such a manner as to cause the extract to enter the blood stream.

3 Claims, No Drawings

METHOD OF RAISING THE WHITE BLOOD CELL COUNT

CROSS REFERENCE TO RELATED APPLICATION

This is a continuation-in-part application of U.S. Pat. application Ser. No. 739,639, filed June 25, 1968, in the name of the same inventors, Elton S. Cook and Leo G. Nutini, and entitled "METHOD OF RAISING THE WHITE BLOOD CELL COUNT", now abandoned.

BACKGROUND OF THE INVENTION

1. Field of the Invention

The present invention relates to a method of control of the white blood cell count in mammals, and more particularly to the increasing of the white blood cell count especially where the white blood cell count has been depressed by disease, chemical preparations, radiation or the like.

2. Description of the Prior Art

In United States Letters Patent Nos. 2,320,478 and 2,320,479, George S. Sperti taught the preparation of deproteinized extracts which promoted respiration of animal cells. These extracts comprise materials, organic in origin and complex in nature, derived by extraction from various vegetable and animal materials such as yeast, malt combings, brain, spleen, liver and others.

These extracts are prepared, for example, by extracting the plant or animal matter with ethyl alcohol for up to about 8 hours, separating solid from liquid and evaporating the liquid under reduced pressure to remove the alcohol and to concentrate the extract.

Variations may be made in the procedure. For example, ethyl alcohol denatured with methyl alcohol may be used. An initial extraction with water, followed by addition of alcohol to 80 percent, may be employed and is especially useful for animal tissue. Various purification procedures, such as further extraction with ether to remove fat, adsorption on charcoal, precipitation with acetone, etc., may be useful. Various vegetable and animal materials may serve as sources, such as yeast, malt combings, spleen and liver. Respiratory activity is determined by assay in Warburg respirometers and the activity is expressed in terms of respiratory units. Examples of sources, processes, and assay may be found in:

United States Letters Patent 2,320,478 and 2,320,479;
Cook, Kreke and Nutini, Studies Institutum Divi Thomae, 2, 23 (1938);
Cook and Kreke, ibid. 2, 173 (1939);
Cook and Walter, ibid. 2, 189 (1939);
Cook and Kreke, ibid. 2, 215 (1939);
Cook and Walter, ibid. 2, 239 (1939);
Cook and Walter, ibid. 3, 39 (1941);
Cook and Walter, ibid. 3, 139 (1941);
Cook, Walter, Rack, Eilert, and Sawyer, ibid. 3, 147 (1941);
Ruddy, Arch. exp. Zellforsch, 22, 599 (1939); and
Cook and Kreke, Acta Unio intern. contra Cancrum, 7, 545 (1951).

For purposes of convenience, the extract taught in the above mentioned patents will hereinafter be referred to in the specification and claims as "PCO".

A number of preparations have been produced and sold containing a combination of PCO and other ingredients including a cellular proliferation agent and the like for use as topical remedies for external lesions or irritations. Thus, a composition containing these agents in a suitable vehicle and in some instances containing a bactericide, have come into widespread use for the treatment of burns, skin abrasions or lesions, hemorrhoids and the like. In addition, PCO has been included in the composition of cosmetics and the like, to overcome the adverse effects to the skin often accompanying the use of such compositions.

In the copending application, in the names of Elton S. Cook and Leo G. Nutini, entitled MEANS AND A METHOD FOR CONTROLLING THE TOXICITY OF DRUG PRODUCTS, Serial No. 825,068 filed May 15, 1969 (now abandoned in favor of a continuation-in-part application in the name of the same inventors and having the same title, Ser. No. 159,465, filed July 2, 1971), the use of PCO in combination with non-topical drug substances for internal use is taught. The copending application is based on the discovery that when the use of drug preparations known to have toxic effects is coupled with the use of PCO, the toxic effects of the drug preparations will be eliminated or greatly reduced. This is true despite the fact that the toxic effects of the drug preparations are not directly or obviously connected with any aspect of cellular respiration. The copending application sets forth that PCO may be used prophylactically or prior to the administration of the drug preparation, simultaneously with the administration of the drug preparation, or after administration of the drug preparation. The drug preparation and PCO must both be present in the blood stream at the same time. This seems to indicate that the toxic effects of the drug preparation are controlled by a combination of the PCO and the drug preparation, acting together. No basis has as yet been discovered for an assumption that the PCO and the drug preparation interact or come into chemical union with each other.

The present invention is directed to the discovery that PCO, when administered in such a way as to cause it to enter the blood stream of a mammal, will increase the white blood cell count of the mammal. This is true when PCO is administered alone as well as in conjunction with drug preparations known to depress the white blood cell count. This is additionally true despite the fact that the white blood cell count is not believed to be directly or obviously connected with any aspect of cellular respiration.

SUMMARY OF THE INVENTION

The present invention is directed to the discovery that the administration of PCO, directly or indirectly into the blood stream of a mammal, will result in an increase in the white blood cell count. Thus, when administered as hereinafter described, the present invention provides a means for raising the white blood cell count, irrespective of the cause for the count depression.

DESCRIPTION OF THE PREFERRED EMBODIMENTS

White cells are produced primarily by bone marrow and constitute one of the primary defense mechanisms in mammals against infections. The effectiveness of this defense mechanism is lost or appreciably diminished when the white blood cell count is depressed below the normal level.

There are a number of ways in which the white blood cell count in mammals may be depressed below the normal level. For example, certain diseases such as influenza, measles, various types of tuberculosis, all pyogenic infections in the terminal stages, histoplasmosis, malaria and the like will produce such a depression. Certain chemical compositions such as nitrogen mustard are known to destroy bone marrow and thus depress the white blood cell count. A low white blood cell count can be one of the results of exposure to radiation.

It has been discovered that PCO, when introduced directly or indirectly into the blood stream of a mammal, will increase the white blood cell count without significant effect on the red blood cell count. In this way, a depressed white blood cell count can be brought to a normal level, irrespective of the cause of the depression. In addition, a normal white blood cell count can be raised for prophylactic reasons or the like.

The PCO must be administered in such a manner as to cause it to enter the blood stream. Suitable methods include intravenous, subcutaneous or intramuscular injection and oral administration. Dosages will, of course, vary depending upon the method of administration used, the reaction of the recipient to the PCO, and the condition of the recipient and the response of the white blood cell count.

While the reasons for this action of PCO on the white blood cell count are not fully understood, this effect appears to be attributable to PCO alone and is obtainable when PCO is the only material added to the blood stream. While not wishing to be bound by theory, it is believed that the PCO reaches the bone marrow and somehow affects the white blood cell production.

In Examples I through V to follow, the PCO used was an extract from yeast and was made in the manner outlined above and in the above mentioned patents. In some instances the PCO used was produced under applicants' supervision. In other instances it was obtained from Stanley Drug Products, Inc. as a commercially available product under their registered trademark, "PROCYTOXID".

Examples I, II and III involve the treatment of female mice. By taking blood counts of ten normal female mice of the same type and comprising the controls, the normal or mean while blood cell count for such mice was determined by standard methods to be 6650 ± 520. The figure, ±520, represents the Standard Error calculated by the usual methods known in the art.

EXAMPLE I

This is a typical two-part experiment illustrating the effect of PCO on the red and white cell counts in normal mice.

Procedure - Part I

Female mice received subcutaneous injections of PCO, 25 mg. per injection, as follows:

Group 1: Three mice were each given one injection of 25 mg. PCO (equivalent to approximately 1 g./Kg. of body weight).

Group 2: Three mice were each given an injection of 25 mg. every other day for a total of 50 mg. PCO (equivalent to approximately 2 g./Kg. of body weight).

Group 3: Three mice were each given an injection of 25 mg. every other day for a total of 75 mg. PCO (equivalent to approximately 3 g./Kg. of body weight).

Blood counts were made of each animal 24 hours after it received its last injection.

Part II

Group 1: Three mice were each given one injection of 100 mg. PCO (equivalent to approximately 4 g./Kg. of body weight).

Group 2: Three mice were each given an injection of 100 mg. PCO every other day for a total of 200 mg. (equivalent to approximately 8 g./Kg. of body weight).

Group 3: Three mice were each given an injection of 100 mg. PCO every other day for a total of 300 mg. (equivalent to approximately 12 g./Kg. of body weight).

Group 4: Three mice were each given an injection of 100 mg. PCO every other day for a total of 400 mg. (equivalent to approximately 16 g./Kg. of body weight).

The results of this experiment are summarized in the following table.

TABLE I

Effects of PCO on Blood Cell Counts in Mice 24 Hours After Last Treatment

| Mouse Number | Number of Injections | Mg. PCO per Injection | Total mg. of PCO | White Blood Cell Count | Red Blood Cell Count (×10³) |
|---|---|---|---|---|---|
| 1 | 1 | 25 | 25 | 6,300 | 10,750 |
| 2 | 1 | 25 | 25 | 11,400 | 9,800 |
| 3 | 1 | 25 | 25 | 3,450 | 9,940 |
| Mean | 1 | 25 | 25 | 7,050 ±2325* | 10,160 ±296* |
| 4 | 2 | 25 | 50 | 6,950 | 11,570 |
| 5 | 2 | 25 | 50 | 4,500 | 9,460 |
| 6 | 2 | 25 | 50 | 4,450 | 11,790 |
| Mean | 2 | 25 | 50 | 5,300 ±825* | 10,940 ±743* |
| 7 | 3 | 25 | 75 | 9,500 | 11,590 |
| 8 | 3 | 25 | 75 | 7,700 | 9,240 |
| 9 | 3 | 25 | 75 | 9,900 | 10,510 |
| Mean | 3 | 25 | 75 | 9,000 ±675* | 10,447 ±681* |

PART II

| 1 | 1 | 100 | 100 | 7,300 | 10,930 |
| 2 | 1 | 100 | 100 | 4,450 | 12,370 |
| 3 | 1 | 100 | 100 | 4,500 | 12,820 |
| Mean | 1 | 100 | 100 | 5,400 ±942* | 12,040 ±570* |
| 4 | 2 | 100 | 200 | 10,850 | 13,250 |
| 5 | 2 | 100 | 200 | 6,800 | 10,820 |
| 6 | 2 | 100 | 200 | 10,200 | 11,370 |
| Mean | 2 | 100 | 200 | 9,300 ±1259* | 11,813 ±736* |
| 7 | 3 | 100 | 300 | 11,150 | 9,140 |
| 8 | 3 | 100 | 300 | 11,450 | 6,050 |
| 9 | 3 | 100 | 300 | 8,300 | 10,380 |
| Mean | 3 | 100 | 300 | 10,300 ±1082* | 8,523 ±1289* |
| 10 | 4 | 100 | 400 | 12,250 | 11,650 |
| 11 | 4 | 100 | 400 | 10,600 | 9,360 |
| 12 | 4 | 100 | 400 | 12,600 | 10,980 |
| Mean | 4 | 100 | 400 | 11,800 ±617 | 10,660 ±602* |

*Standard Error

Part I of the above experiment indicates that one or two subcutaneous injections of PCO, at 25 mg. PCO per injection, illustrate some effect on the white cell count of normal mice even after 24 hours. Three injections result in a marked increase in the white count. Three injections do not, however, affect the red count.

As will be evident from Table I, Part II of the above experiment, the white count rises steadily with increased injections of PCO at 100 mg. PCO per injection. The white count of those mice receiving four injections of PCO (a total of 400 mg. PCO) rose approximately 100 percent over the controls. Part II of the above experiment further illustrates that the red blood cell count remained unaffected by PCO injections even at the highest level of 400 mg. PCO given in four injections of 100 mg. PCO each.

As indicated above, it has additionally been discovered that introduction of PCO into the blood stream will cause a white blood cell count which has been depressed to return to normal. This is true, irrespective of the reason for the white count depression.

EXAMPLE II

In this example, normal mice were treated with nitrogen mustard, a preparation known to destroy bone marrow and depress the white blood cell count. After administration of the nitrogen mustard had been stopped, PCO was administered to return the white blood cell count to normal.

Procedure 30 female mice were each given an injection of 0.025 mg. HN2 every other day for a total of five injections (equivalent to approximately 5 mg./Kg. of body weight). From previous experiments it was known that this dosage would be sufficient to result in a relatively high percentage of deaths. The 24 surviving mice were then divided into two groups of 12 each. One received no further treatment and acted as the control mice. The other group received two subcutaneous injections of PCO, 50 mg. PCO per injection (equivalent to a total of approximately 4 g./Kg. of body weight). The first injection was given the day after the last injection of HN2 and the second injection was given three days thereafter. Red and white blood counts were taken of all groups.

The results of this experiment are summarized in Tables II and III.

TABLE II

| Days | Treatment | No. Dead | Percent Mortality |
|---|---|---|---|
| 0 | 0 | 0/20 | 0 |
| 1 | HN2 | 0/30 | 0 |
| 3 | HN2 | 0/30 | 0 |
| 5 | HN2 | 0/30 | 0 |
| 7 | HN2 | 1/30 | 3.3 |
| 8 | 0 | 3/30 | 10 |
| 9 | HN2 | 5/30 | 16.6 |
| 10 | 0 | 6/30 | 20 |
| Subgroup 1 (no further treatment) | | | |
| 0 | 0 | 1/12 | 8 |
| 1 | 0 | 1/12 | 8 |
| 2 | 0 | 3/12 | 25 |

| | | | |
|---|---|---|---|
| 3 | 0 | 5/12 | 42 |
| 4 | 0 | 6/12 | 52 |
| 5 | 0 | 6/12 | 50 |
| Subgroup 2 (2 injections of PCO) | | | |
| 0 | PCO | 0/12 | 0 |
| 1 | 0 | 1/12 | 8 |
| 2 | PCO | 1/12 | 8 |
| 3 | 0 | 1/12 | 8 |
| 4 | 0 | 1/12 | 8 |
| 5 | 0 | 1/12 | 8 |

TABLE III

Effects of HN2 on Blood Counts of BT Mice and of PCO on Recovery

| Mouse | No. Inj. HN2 | White Blood Cell Count | Red Blood Cell Count ($\times 10^3$) |
|---|---|---|---|
| 1 | 0 | 6,950 | 9,790 |
| 2 | 0 | 5,550 | 9,050 |
| Mean | 0 | 6,250 ±700* | 9,420 ±370* |
| 3 | 4 | 3,550 | 9,140 |
| 4 | 4 | 1,750 | 10,260 |
| 5 | 4 | 2,750 | 10,040 |
| 6 | 4 | 3,250 | 9,570 |
| Mean | 4 | 2,825 ±398* | 9,753 ±251* |
| 7 | 5 | 2,220 | 11,560 |
| 8 | 5 | 950 | 9,220 |
| 9 | 5 | 900 | 8,150 |
| 10 | 5 | 3,450 | 9,480 |
| Mean | 5 | 1,875 ±605* | 9,600 ±713* |
| Subgroup 1 (no further treatment) | | | |
| 11 | — | 3,400 | 6,230 |
| 12 | — | 1,650 | 3,160 |
| Mean | — | 2,525 ±875* | 4,695 ±1,535* |
| 13 | — | 9,350 | 6,400 |
| 14 | — | 9,100 | 5,670 |
| 15 | — | 4,200 | 4,830 |
| 16 | — | 3,250 | 5,940 |
| 17 | — | 6,350 | 7,050 |
| Mean | — | 6,450 ±1,240 | 6,000 ±433* |
| Subgroup 2 (2 injections of PCO) | | | |
| 18 | — | 4,550 | 8,390 |
| 19 | — | 6,350 | 9,020 |
| 20 | — | 2,250 | 8,170 |
| Mean | — | 4,390 ±1186 | 8,530 ±254* |
| 21 | — | 8,250 | 7,640 |
| 22 | — | 3,950 | 6,800 |
| 23 | — | 8,850 | 5,630 |
| Mean | — | 7,000 ±1,548* | 6,700 ±583* |

*Standard error

After the fifth and last injection of nitrogen mustard, the white blood cell count dropped from the normal of approximately 6650 to less than 2000. During this period 20 percent of the mice died.

The surviving mice were divided into sub-group 1 and sub-group 2. The mice of sub-group 1 were given no further treatment and reached a mortality of 50 percent by the end of the fourth day. The mice of sub-group 2 received PCO as indicated and 8 percent died on the second day with no further deaths recorded.

The above experiment shows that two injections of 50 mg. each of PCO are sufficient to materially decrease the death rate resulting from the prior use of nitrogen mustard. The results additionally show that the average white blood cell count of the PCO treated group returned rapidly to normal, while the recovery of the white blood cell count in the animals not receiving PCO was slower.

The red blood cell count in both groups continued to drop after nitrogen mustard treatments were discontinued. However, after PCO treatments began, the average red blood cell count of the PCO treated group did not decline as rapidly as those receiving no PCO treatments. The red blood cell count in the PCO treated group (sub-group 2) did not drop as low as in the non-treated group (sub-group 1).

EXAMPLE III

In this example normal female mice were treated simultaneously with nitrogen mustard and PCO to determine if PCO has any influence on the effect of HN2 on the red or white blood cell count in normal mice.

Procedure - Part I 13 female mice, 11–12 weeks old, each received a subcutaneous inoculation of 0.025 mg. HN2 (equivalent to approximately 1 mg./Kg. of body weight) every other day for a total of five injections. Peripheral blood was drawn 24 hours after each inoculation and white and red counts determined. The results of this experiment are summarized in Table IV below.

TABLE IV

Blood Counts of BT Mice Given HN2

| Mouse No. | No. of HN2 inj. | White Blood Cell Count | Red Blood Cell Count ($\times 10^3$) |
|---|---|---|---|
| 11 | | 6,600 | 10,350 |
| 21 | | 4,650 | 9,490 |
| Mean1 | | 5,625 ±975* | 9,920 ±430* |
| 32 | | 5,350 | 9,900 |
| 42 | | 4,450 | 10,730 |
| Mean2 | | 4,900 ±450* | 10,315 ±415* |
| 53 | | 4,200 | 10,110 |
| 63 | | 3,500 | 10,080 |
| 73 | | 2,700 | 11,740 |
| Mean3 | | 3,466 ±433* | 10,643 ±548* |
| 84 | | 2,550 | 10,670 |
| 94 | | 1,100 | 9,680 |
| 104 | | 3,050 | 10,610 |
| Mean4 | | 2,233 ±581* | 10,320 ±320* |
| 115 | | 1,900 | 7,530 |
| 125 | | 2,250 | 8,450 |
| 135 | | 850 | 6,960 |
| Mean5 | | 1,666 ±413* | 7,647 ±434* |

*Standard Error

Procedure - Part II

Five groups of mice were given subcutaneous injections of 0.025 mg. of HN2 and 25 mg. of PCO per injection administered simultaneously.

Group I: Two mice each received a single injection (equivalent to approximately 1 mg./Kg. HN2 and 1 g./Kg. PCO).

Group II: Two mice each received an injection every other day for a total of two injections (equivalent to approximately 2 mg./Kg. HN2 and 2g./Kg. PCO).

Group III: Three mice each received an injection every other day for a total of three injections (equivalent to approximately 3 mg./Kg. HN2 and 3 g./Kg. PCO).

Group IV: Three mice each received an injection every other day for a total of four injections (equivalent to approximately 4 mg./Kg. HN2 and 4 g./Kg. PCO).

Group V: Three mice each received an injection every other day for a total of six injections (equivalent to approximately 6 mg./Kg. HN2 and 6 g./Kg. PCO).

Red and white blood cell counts were made for each mouse 24 hours after the last injection was given. The results of this experiment are summarized in Table V.

TABLE V

Blood Counts of BT Mice Given HN2 Plus PCO 24 Hours After Last Treatment

| mouse no. | no. inj. | mg. of HN2 per inj. | mg. of PCO per inj. | mg. of total HN2 | total mg. of PCO | white blood cell Count | red blood cell count ($\times 10^3$) |
|---|---|---|---|---|---|---|---|
| 11 | | 0.025 | 25 | 0.025 | 25 | 6,400 | 12,300 |
| 11 | | 0.025 | 25 | 0.025 | 25 | 6,100 | 10,560 |
| Mean1 | | 0.025 | 25 | 0.025 | 25 | 6,250 ±150* | 11,430 ±870* |
| 32 | | 0.025 | 25 | 0.05 | 50 | 4,750 | 12,130 |
| 42 | | 0.025 | 25 | 0.05 | 50 | 5,750 | 12,460 |
| Mean2 | | 0.025 | 25 | 0.05 | 50 | 5,250 ±500* | 12,295 ±165** |
| 53 | | 0.025 | 25 | 0.075 | 75 | 4,000 | 10,060 |
| 63 | | 0.025 | 25 | 0.075 | 75 | 8,250 | 9,270 |
| 73 | | 0.025 | 25 | 0.075 | 75 | 2,750 | 11,740 |
| Mean3 | | 0.025 | 25 | 0.075 | 75 | 5,000 ±1710* | 10,357 ±728* |
| 84 | | 0.025 | 25 | 0.10 | 100 | 4,800 | 9,680 |

|     |       |    |      |     |       |       |
|-----|-------|----|------|-----|-------|-------|
| 94  | 0.025 | 25 | 0.10 | 100 | 4,700 | 9,040 |
| 104 | 0.025 | 25 | 0.10 | 100 | 7,100 | 9,230 |
| Mean4 | 0.025 | 25 | 0.10 | 100 | 5,500 | 9,317 |
|     |       |    |      |     | ±784* | ±190* |
| 116 | 0.025 | 25 | 0.15 | 150 | 3,200 | 8,570 |
| 126 | 0.025 | 25 | 0.15 | 150 | 3,150 | 8,810 |
| 136 | 0.025 | 25 | 0.15 | 150 | 7,050 | 9,220 |
| Mean6 | 0.025 | 25 | 0.15 | 150 | 4,500 | 8,867 |
|     |       |    |      |     | ±292* | ±190* |

*Standard Error

The mice in Part I comprised the controls for this experiment. As indicated in Table IV and in keeping with the findings of other observers, the white cell count of normal mice decreases continuously with increased number of injections of HN2. With a single injection of 0.025 mg. of HN2, the average white count was approximately normal at 5,600 and reached a low of approximately 1,600 after five injections. The red count remained normal for four injections but dropped after the fifth injection.

Part II of the experiment indicated that there was no significant drop in either red or white blood cell count as a result of one, two, three or four injections of the combination of 0.025 mg. HN2 and 25 Mg. PCO in normal mice. There was some drop in both the red and white blood cell counts after the sixth injection, but the white blood cell count was nevertheless maintained at a significantly higher level than that displayed by the controls.

EXAMPLE IV

The purpose of this experiment was to determine the effect of a single intravenous injection of PCO on the red and white blood cell counts of rabbits.

Procedure

Each of six New Zealand white rabbits was given a single injection of 75 mg/kg of PCO intravenously into the ear vein. The PCO was in aqueous solution at a concentration of 374 mg/ml.

Blood samples were taken out and cell counts made on all rabbits before treatment began. Counts were again made four hours, 22 hours and 120 hours after treatment. This data is set forth in Table VI.

TABLE VI

Effect of Single Intravenous Injection of

PCO in Blood Count of Rabbits

| Animal No. | Weight g. |     | Before PCO | 4 Hr. after | 22 Hr. after | 120 Hr. after |
|---|---|---|---|---|---|---|
| 1 | 2,445 | WBC | 6,350 | 10,400 | 10,800 | 10,250 |
|   |       | RBC* | 5.85 | 5.92 | 5.68 | 5.37 |
| 2 | 2,097 | WBC | 9,100 | 16,600 | 11,350 | 11,950 |
|   |       | RBC* | 5.81 | 6.35 | 5.72 | 5.92 |
| 3 | 2,080 | WBC | 6,400 | 8,250 | 8,450 | 8,800 |
|   |       | RBC* | 6.14 | 6.17 | 5.48 | 5.65 |
| 4 | 2,727 | WBC | 6,600 |  | 8,750 | 6,500 |
|   |       | RBC* | 6.14 |  | 6.27 | 6.29 |
| 5 | 2,242 | WBC | 10,650 |  | 10,700 | 7,800 |
|   |       | RBC* | 6.29 |  | 5.79 | 6.12 |
| 6 | 2,190 | WBC | 7,450 |  | 7,400 | 7,250 |
|   |       | RBC* | 5.6 |  | 5.53 | 5.62 |
| Aver. WBC |  |  | 7,750 | 11,720 | 9,570 | 8,250 |
| Aver. % change |  |  |  | +51 | +23.5 | +6.5 |

*$\times 10^6$

From the results which are recorded in Table VI, it will be noted that in the three animals tested after four hours there was a substantial rise in white count, the average being 51 percent. The average white count for all rabbits six showed a rise of 23.5 percent above the starting value at the end of 22 hours, and dropped approximately 6.5 percent at the end of 120 hours.

The red count remained essentially constant throughout the test period.

With respect to control animals receiving saline solution, Table VIII (of Example V below) indicates that the average weight showed a normal increase and the red and white counts remained practically constant.

It will be noted from Example IV, in which the PCO was administered in a single injection, that the white cell count rose substantially four hours after the injection of PCO. The stimulation decreased after 22 hours and returned to nearly normal after 120 hours.

Example V, below, was planned to determine the effects of repeated intravenous injections of PCO.

EXAMPLE V

Procedure

Three New Zealand white rabbits, five to six weeks old, were given intravenous injections of 100 mg/kg of PCO twice daily on four successive days for a total of 800 mg/kg of body weight. The PCO was in aqueous solution at a concentration of 300 mg/ml.

The animals were weighed, and red and white blood cell counts made three days before and 24, 96 and 168 hours after the last injection. This data is set forth in Table VII.

Three rabbits, serving as controls, received saline solution in the same volume and at the same time intervals, as the animals receiving PCO. Data relating to the controls was collected in the same manner as was the data with respect to the experimental animals and is set forth in Table VIII.

TABLE VII

Effect of Repeated Intravenous Injection of PCO on Blood Count of Rabbits

| Animal No. |  | 72 hrs. Before Inj. | 24 hrs. After last inj. | 96 hrs. After last inj. | 168 hrs. After last inj. |
|---|---|---|---|---|---|
| 1 | wt., g. | 2,372 | 2,510 | 2,545 | 2,617 |
|   | WBC | 9,400 | 10,350 | 9,050 | 10,650 |
|   | RBC* | 6.52 | 6.68 | 6.52 | 6.15 |
| 2 | wt., g. | 2,585 | 2,745 | 2,714 | 2,873 |
|   | WBC | 10,600 | 13,300 | 10,850 | 10,950 |
|   | RBC* | 7.12 | 6.50 | 6.58 | 7.15 |
| 3 | wt., g. | 2,365 | 2,402 | 2,320 | 2,234 |
|   | WBC | 9,000 | 11,150 | 7,500 | 10,050 |
|   | RBC* | 6.25 | 5.45 | 5.61 | 5.42 |
| Average wt., g. |  | 2,441 | 2,552 | 2,526 | 2,575 |
|  | WBC | 9,667 | 11,600 | 9,124 | 10,550 |
|  | RBC* | 6.63 | 6.21 | 6.24 | 6.24 |
| Average % change WBC |  |  | +16.6 | −6.6 | +9.1 |

TABLE VIII

Effect of Repeated Intravenous Injection

Of Saline Solution on Blood Count of Rabbits

| Animal No. |  | 72 hrs. Before Inj. | 24 hrs. after last inj. | 96 hrs. after last inj. | 168 hrs. after last inj. |
|---|---|---|---|---|---|
| 1 | wt., g. | 2,186 | 2,355 | 2,331 | 2,409 |
|   | WBC | 12,750 | 9,700 | 9,800 | 10,050 |
|   | RBC* | 5.07 | 5.12 | 5.16 | 5.42 |
| 2 | wt., g. | 2,400 | 2,546 | 2,507 | 2,520 |
|   | WBC | 10,350 | 12,050 | 13,350 | 10,500 |
|   | RBC* | 5.99 | 6.17 | 6.24 | 6.09 |
| 3 | wt., g. | 2,025 | 1,985 | 2,086 | 2,172 |
|   | WBC | 11,850 | 12,400 | 12,200 | 11,900 |
|   | RBC* | 6.62 | 6.64 | 6.67 | 6.57 |
| Average wt., g. |  | 2,204 | 2,295 | 2,308 | 2,334 |
|  | WBC | 11,650 | 11,380 | 11,780 | 10,817 |
|  | RBC* | 5.98 | 5.97 | 6.02 | 6.03 |
| Average % change WBC |  |  | −2.3 | +1.1 | −7.2 |

The results shown in Table VII indicate that two of the three animals showed a gain in weight, while the third showed a small loss, the average being on the positive side.

The average red count showed a small decrease but it was not considered significant.

The white count in each animal showed an increase after 24 hours, the average being 16.6 percent. There was a small decrease in white count after 96 hours and an increase after 168 hours, neither of which was considered significant. It was concluded that for all practical purposes the white count could be considered to have returned to normal after 96 hours.

The data for the control animals (Table VIII) indicate no adverse effects from the injection procedure.

In the experiments above, the PCO was in the form of aqueous solutions, the PCO having been dissolved in a suitable volume of water to give the desired weight of PCO. When used, the nitrogen mustard was dissolved in a physiological saline solution of desired concentration, as is common in the art. When PCO and nitrogen mustard were administered simultaneously, the solutions of each were mixed.

The minimum effective amount of PCO in a single subcutaneous injection is about 400 mg. PCO/kg of body weight of the recipient. The minimum effect amount of PCO in a single intravenous injection is about 50 PCO/kg of body weight of the recipient. The invention contemplates both single and multiple injections. Dosages may be increased to the ultimate desired levels in the manner well known in the art. Desired dosage levels will depend on the usual and well known factors including method of administration, speed of administration, physical condition and personal reaction of the individual recipient, response of the white blood cell count of the recipient, etc.

The embodiments of the invention in which an exclusive property or privilege is claimed are defined as follows:

1. A method of increasing the white blood cell count in mammals comprising the step of administering PCO orally or by injection to the mammal so that said PCO enters the bloodstream of said recipient, said PCO being an extract prepared by extracting with ethyl alcohol a material chosen from the class consisting of yeast, malt combings, spleen and liver, separating solid from liquid, and evaporating the liquid under reduced pressure to remove the alcohol and to concentrate the extract, said PCO being administered in an amount sufficient to raise said white blood cell count to the desired level.

2. The method claimed in claim 1 wherein said PCO is administered by at least one subcutaneous injection containing said PCO in an amount equal to at least about 400 mg. PCO/kg. of body weight of said mammal.

3. The method claimed in claim 1 wherein said PCO is administered by at least one intravenous injection containing said PCO in an amount equal to at least about 50 mg. PCO/kg. of body weight of said mammal.

* * * * *